April 5, 1932.　　　　H. L. YOUNG　　　　1,852,831
TUBE TRIMMING METHOD AND APPARATUS
Filed April 6, 1928　　　7 Sheets-Sheet 1

April 5, 1932. H. L. YOUNG 1,852,831

TUBE TRIMMING METHOD AND APPARATUS

Filed April 6, 1928 7 Sheets-Sheet 7

Inventor
Harvey L. Young
By
Pierson, Eakin & Avery
Attys.

Patented Apr. 5, 1932

1,852,831

UNITED STATES PATENT OFFICE

HARVEY L. YOUNG, OF AKRON, OHIO, ASSIGNOR TO THE B. F. GOODRICH COMPANY, OF NEW YORK, N. Y., A CORPORATION OF NEW YORK

TUBE TRIMMING METHOD AND APPARATUS

Application filed April 6, 1928. Serial No. 268,045.

This invention relates to methods and apparatus for trimming excess material from articles such as rubber tubes and especially to procedure and apparatus for removing surplus rubber composition from a tubular rubber structure built upon a cylindrical mandrel.

The invention is primarily applicable to the trimming of tubular rubber structures in the manufacture of inner tubes for pneumatic tire casings by the method wherein a sheet of unvulcanized rubber is wrapped circumferentially about a straight cylindrical mandrel and then vulcanized on the latter and subsequently is removed therefrom and its ends spliced together to produce an annular inflatable tube, the excess rubber preferably being trimmed from the tube prior to its vulcanization.

The manufacture of inner tubes necessarily includes tubes of various diameters and lengths, and in the practice of the above described method it is customary to wrap the mandrel with a rubber sheet of greater length than the maximum length of any tube to be made on the particular mandrel, and then to remove the surplus stock at each end to produce a tube of the desired length, the purpose being to avoid frequent changes of stock length and to produce tubes of uniform end structure. So far as I am aware, the trimming of the tube ends heretofore has been manually performed.

One of the chief objects of this invention is to provide an improved method and automatic apparatus for removing surplus material from articles such as rubber tubes. Another object is to provide apparatus of the character described which will be adapted to operate on tubes of various lengths and diameters. More specifically my invention aims to save time and labor in the manufacture of inner tubes for pneumatic tire casings.

General description

Mandrels with unvulcanized rubber tubes built thereon are brought to the trimming apparatus upon an endless conveyor belt from a mandrel wrapping station, said mandrels moving in an axial direction until they reach the proper position in the trimming device and there actuate kick-off mechanism which moves them laterally off the conveyor and onto an inclined storage-chute comprising one end of a trackway which supports the mandrels by engagement with their respective end portions.

The mandrels are propelled along the trackway by a pair of endless drive-chains having mandrel-engaging fingers which permit the mandrels to rotate on their own axis as they move laterally. The mandrel-engaging fingers also actuate escapement mechanism for delivering successive mandrels from the storage-chute at proper intervals to be engaged by the propelling fingers. The travel of the mandrels carries them over a pair of spaced cutters which cut through the tube-stock on each mandrel in a circumferential line of cut adjacent to the ends thereof to define the surplus stock and facilitate its subsequent removal from the mandrels.

The removal of the surplus tube-stock is effected by mechanism which extends into the pathway of the moving mandrels, at each end thereof, and engages the tube-stock outside the cuts therein, biting into and gripping said stock and holding it while the travel of the mandrel unwraps the latter therefrom. Means are provided for ejecting the removed stock from the stock-removing mechanism and from the trimming apparatus. The trimmed tubes are ejected from the apparatus into a chute at the delivery end of the apparatus.

*Kick-off mechanism*

Referring to the drawings, particularly Figs. 1 to 6 inclusive, I show at 20 an endless conveyor belt which traverses one end of the tube-trimming apparatus, and at another part of its orbit passes a mandrel-wrapping station (not shown) where mandrels, such as the mandrel 21 wrapped with sheeted rubber composition to form a tube thereon such as the tube 22, are mounted upon said conveyor to be delivered to the tube-trimming apparatus. One end of the conveyor belt 20 is mounted upon a pulley 23 secured upon a shaft 24 which is journaled in bearing brackets mounted upon the framework 25 of the apparatus, and the other end of the conveyor (not shown) is mounted upon a similar pulley which is driven in any suitable manner. Between said mounting pulleys the upper reach of the conveyor belt 20 rests upon a series of rollers 26, 26 which prevent sagging of the belt, and at each side of the apparatus the belt is depressed and passes beneath rollers 27 or 28 to provide spaces where the end portions of the mandrels 21 will be unsupported so as to provide space for the operation of mechanism for removing said mandrels from the conveyor belt.

Figures 6, 7:
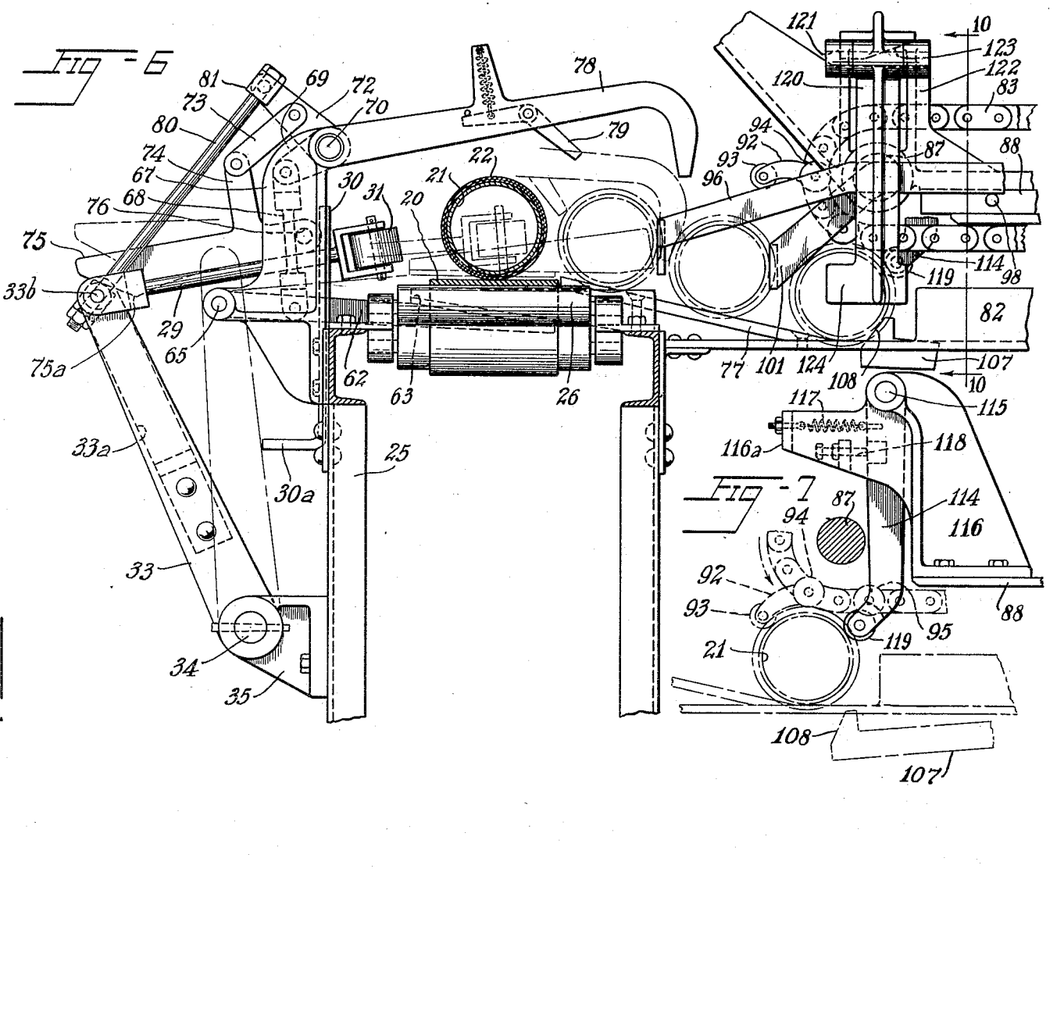
Fig. 6 is a section on line 6—6 of Fig. 5.
Fig. 7 is a section on line 7—7 of Fig. 2.

The mandrel-removing or kick-off mechanism comprises a pair of push-rods 29, 29 which are slidably mounted in respective upstanding apertured ears 30, 30 secured to the framework of the apparatus at the end thereof beside the conveyor 20, said push-rods being positioned at spaced-apart points and adapted, when actuated by mechanism presently to be described, to be projected across the conveyor belt, and, by striking a mandrel 21 at the end portions thereof, push the mandrel laterally from said belt as is clearly indicated by the broken lines of Fig. 6.

The end portions of the push rods 29 are forked and their respective mandrel-engaging ends have rollers 31, 31 journaled therein, the arrangement being such that friction between the push-rods and the mandrel, or the tube 22 thereon, is avoided during the kicking-off operation. The other ends of the push-rods 29 are pivotally connected to the free ends of respective rocker-arms 32, 33 which are keyed upon a rock-shaft 34 journaled adjacent its ends in brackets 35, 35 mounted upon the framework 25 of the apparatus. The free end of the rocker-arm 33 is formed as a yoke by a bracket 33a secured thereto, and a bolt 33b having a square medial portion connects the free ends of the yoke. The rock-shaft 34 is rocked by a downwardly-extending lever 36 which is secured upon said shaft at its near end, as viewed in Figs. 1 and 2.

The lever 36 is urged in one direction, to retract the push-rods 29 after the kicking-off movement, by a tension-spring 37 connected to its free end and to the adjacent framework 25, and it is moved in the opposite direction by a one-way fluid-pressure-operated cylinder 38 to project said push-rods across the conveyor belt 20.

The piston rod 39 of the cylinder 38 has a forked end which is connected to the lever 36 at an intermediate point, and said piston rod also is provided with a rotatable sleeve 40, (see Figs. 3 and 4) having a determinate angular movement. The piston-rod is formed in its inner end with an axial bore 41 which extends past the piston 42 of the cylinder, and a plurality of radial ports 43, 43 extend through the wall of the piston-rod and communicate with said bore. The piston-sleeve 40 also is formed with a plurality of radial ports (not shown) through its wall, which ports, when brought into registry with the ports 43 of the piston rod, effect the exhausting of pressure-fluid from the chamber of the cylinder 38, said fluid passing out through the front end of the cylinder which is open as shown.

The piston-sleeve 40 of the fluid-pressure cylinder 38 is provided with a radial cam-stud 44 which extends into a parallelogram-shaped cam-aperture 45 formed in a cam-plate 46 mounted upon the adjacent framework 25.

Figures 3, 4:
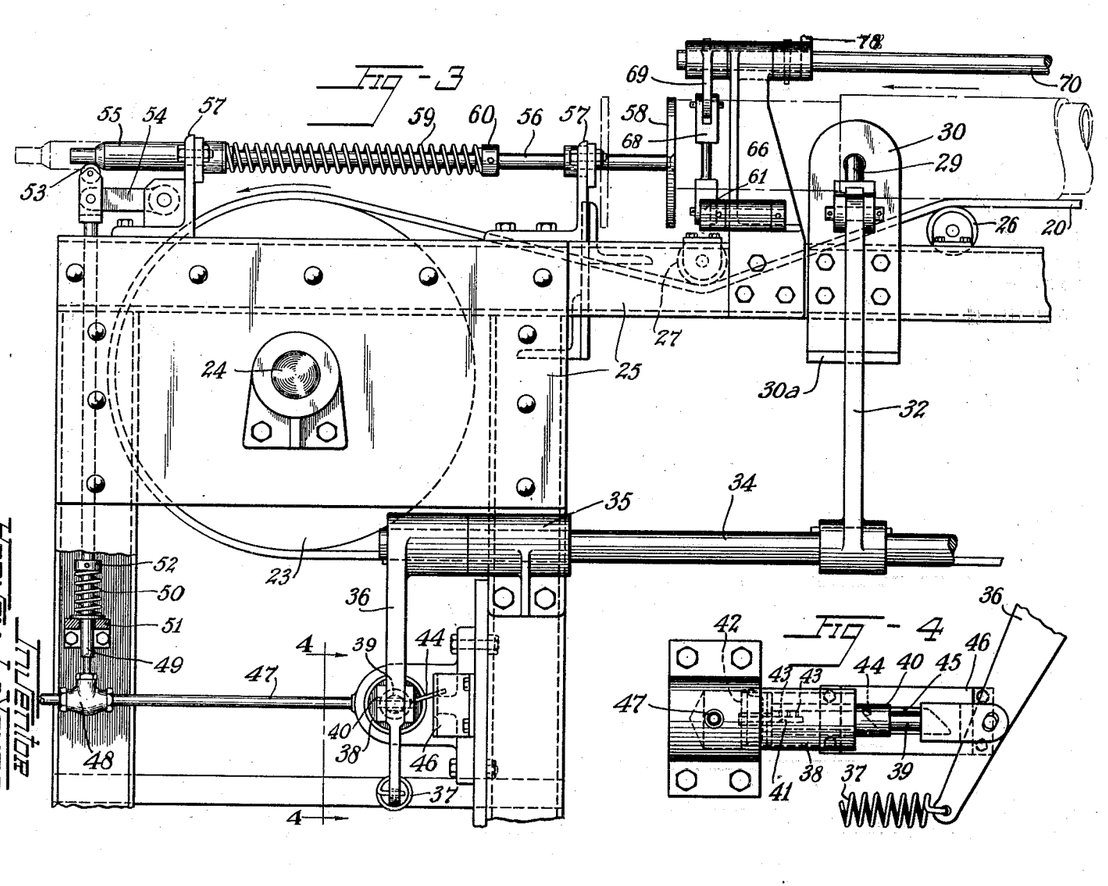
Fig. 3 is a fragmentary end elevation, on a larger scale, of the near side of the apparatus as viewed from the right of Fig. 1.
Fig. 4 is a section on line 4—4 of Fig. 1.
Figure 5:
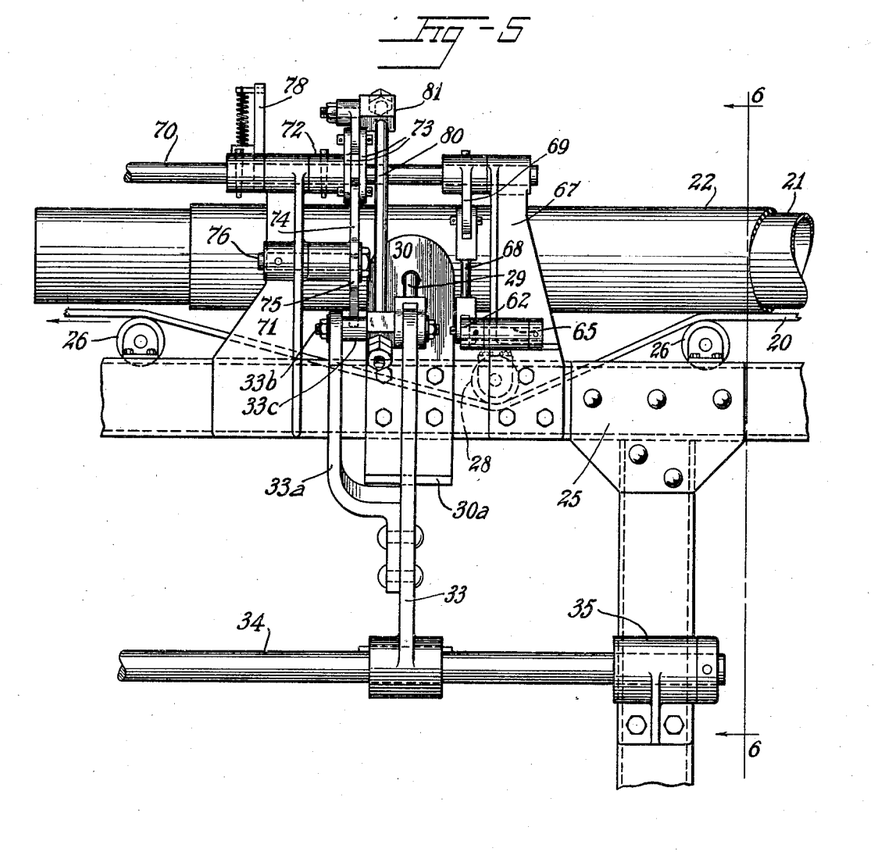
Fig. 5 is a fragmentary end elevation on a larger scale, of the far side of the apparatus as viewed from the right of Fig. 1.

The arrangement is such that when the cylinder members are in the positions shown in Fig. 4, the piston-rod ports 43 and the ports in the piston-rod sleeve 40 will be out of registry, and pressure fluid admitted to the cylinder-chamber through a supply-pipe 47, will force the piston 42 forward to actuate the lever 36. This movement also carries the cam-stud 44 along the straight top-wall of the cam-aperture 45 and then along the oblique wall at the far end thereof. The oblique cam-face changes the angular position of the cam-stud and rotates the sleeve 40 so that the ports in the latter move into registry with the piston-rod ports 43, with the result that the pressure-fluid in the cylinder-chamber escapes, and the spring 37, by retracting the lever 36, forces the piston 42 rearwardly to the point of starting, and the cam-stud 44 is returned to original position by the oblique cam-face at the near end of the cam-aperture, which closes the ports 43.

The forward movement of the lever 36 operates mechanism which, among other things, shuts off the supply of pressure fluid to the cylinder 38 so that the return movement of the piston 42 is possible.

The supply pipe 47 is provided with a quick-opening one-way valve 48 which is actuated by a vertically-movable plunger-rod 49 mounted in the frame of the apparatus and normally held in raised, inoperative position by a compression spring 50 mounted upon the rod and bearing against a fixed bracket 51 on the framework 25 and a collar 52 on the rod. The upper end of the plunger rod 45 is provided with a cam-roller 53, and is connected to the framework 25 by a pivoted link 54 which prevents angular movement of the rod.

For depressing the plunger-rod 49 to open the valve 48 I provide a generally-cylindrical cam 55 having two cylindrical portions of different sizes and a frusto-conical intermediate portion the cam-roller 53 normally bearing against the smaller of said cylindrical portions. The cam 55 is mounted upon one end of a horizontal, axially movable rod 56, which is slidably mounted in brackets 57, 57 upon the top of the framework 25 over the pulley 23. Upon the other end of the rod 56 is a buffer-plate 58 in position to be struck by the end of a mandrel 21 as the latter is brought to the tube-trimming apparatus upon the conveyor belt 20. A compression spring 59 is mounted upon the rod 56 and bears against a collar 60 thereon and one of the brackets 57, said spring normally urging said rod to a forward, work-engaging position, but being yieldable under the impact of a mandrel against the buffer plate 58 so that the cam 55 moves rearwardly to the position indicated by the broken lines of Fig. 3 and thereby depresses the valve-actuating plunger-rod 49.

Figure 2:
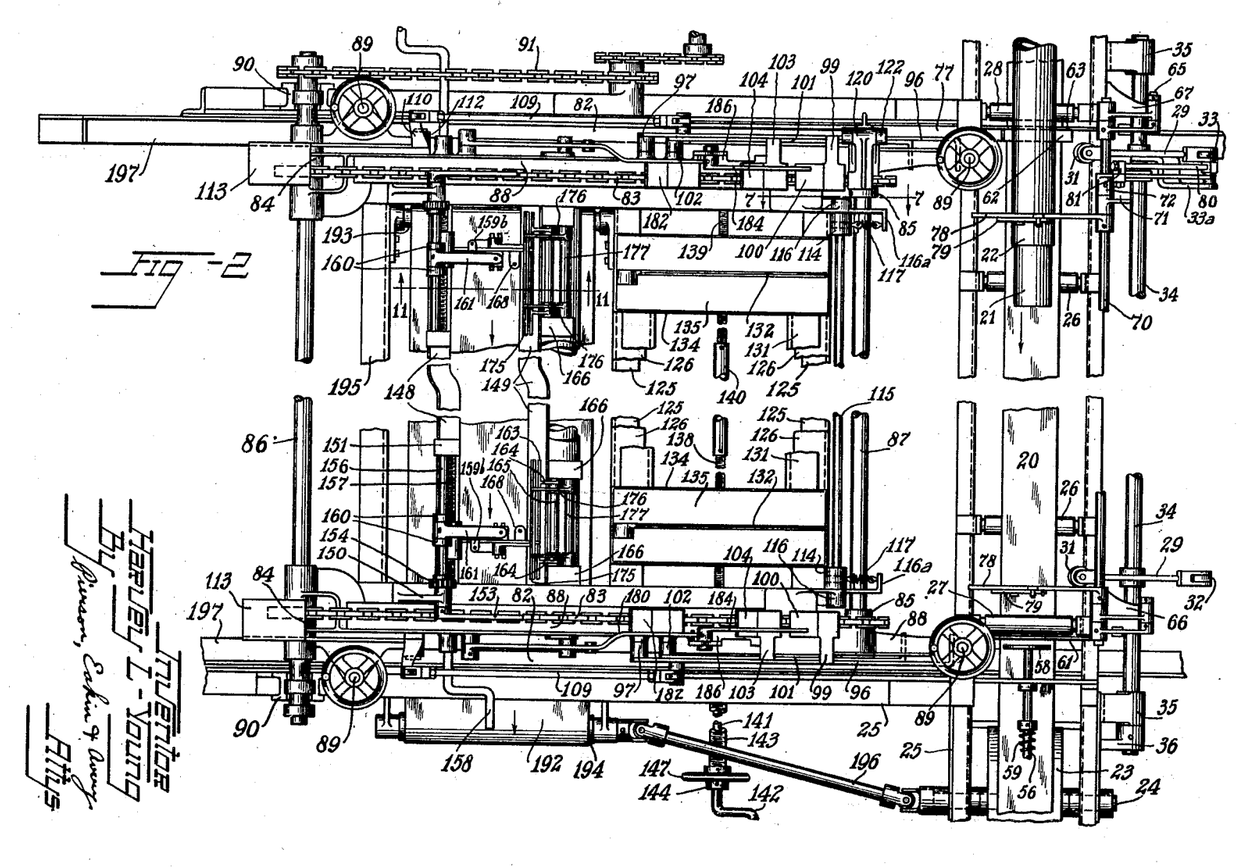
Fig. 2 is a plan view of the apparatus shown in Fig. 1

The covered mandrels 21 before being moved off the conveyor belt 20, are lifted therefrom so that there is no friction between the belt and the rubber tubes 22 on said mandrels during the kicking-off operation. The lifting of the mandrels is effected by levers 61, 62 positioned at opposite sides of the apparatus above the respective depressed portions of the conveyor 20 and adapted to engage the end portions of the mandrels thereon immediately before they are engaged by the push-rods 29. The lifting lever 62, which is at the far side of the apparatus as shown in Fig. 2, is formed with an upstanding marginal flange 63 adapted to abut the trailing end of a mandrel as the latter is raised from the conveyor belt to limit the rebound of the mandrel under the impetus of the recoil of the spring 59.

The levers 61, 62 are pivoted respectively at 64, 65 in journals formed on upstanding brackets, 66, 67 mounted upon the framework 25 beside the conveyor belt 20, and the levers are connected by respective links 68, 68 to respective rocker-arms 69, 69 secured to a rock-shaft 70 which is journaled in bearings formed in the upper portions of the brackets 66, 67 and a similar bracket 71 positioned adjacent the bracket 67.

For rocking the rock-shaft 70 I provide at 72, between the brackets 67, 71, an outstanding lever which has its middle portion connected by a pair of links 73 to an upstanding arm 74 formed on a cam-lever 75 pivoted at 76 on the bracket 71, the bottom margin of the cam-lever 75 being formed, at its outer end, with an oblique cam-face 75a. The cam-lever 75 is actuated by a cam-roller 33c mounted upon the bolt 33b of the rocker-arm 33, the arrangement being such that the cam-lever 75 is raised by the initial forward movement of the rocker-arm 33 with the result that the mandrel 21 is lifted from the conveyor-belt 20 by the levers 61, 62 before being struck by the push-rods 29.

A storage chute is positioned at one side of the conveyor belt 20 in position to receive successive mandrels as they are delivered therefrom, said chute comprising inclined rails 77, 77 mounted upon the framework 25 in position to engage the end portions of the ejected mandrels.

For accurately positioning successive mandrels on the storage chute until they are engaged by suitable escapement mechanism, I provide a pair of L-shaped arms 78, 78 which are mounted upon the rock-shaft 70 adjacent the ends thereof and adapted, when lowered by the angular movement of said shaft, to extend across the conveyor belt and into the path of the mandrels as the latter are moved onto the storage chute. A spring-tensioned pawl 79 is mounted upon each arm 78 and the two pawls are adapted to prevent rebound of a mandrel after it strikes the end portions of said arms.

A rod 80 is slidably mounted at one end in an apertured block 81 which is swivelled in the free end of the lever 72, and has its other end portion extended through an aperture in the square medial portion of the bolt 33b, both ends of the rod 80 being provided with retaining nuts. The arrangement is such that in the forward operative movement of the rocker-arm 33 the bolt 33b will merely slide along the rod 80, but in the rearward movement of said rocker-arm, before the end of its stroke, the bolt 33b will engage the nuts on the end of said rod and by actuating the lever 72, turn the rock-shaft 70, with the result that the arms 78 are raised and the lifting-levers 61, 62 are lowered and the way is cleared for another mandrel to be brought to the apparatus upon the conveyor 20.

Positive stops are provided for limiting the movement of the rocker-arms 32, 33 in either direction to prevent shearing of the stud 44 from the sleeve 40 of the fluid-pressure cylinder 38. For this purpose the bottom marginal portions of the ears 30 are bent at right angles to form abutments 30a, 30a for stopping said rocker-arms at the limit of their forward movement as indicated by the broken lines of Fig. 6, and their rearward movement is stopped when the forked forward ends of the pusher-rods 29 engage the ears 30 as shown by the full lines of Fig. 6.

Mandrel propelling mechanism

Mounted along the top of the framework 25 at each side thereof are respective laterally flanged track-rails 82, 82 positioned in continuation of the rails 77, 77 comprising the storage chute, and together comprising a trackway along which covered mandrels released from said storage chute at determinate intervals are propelled and carried past instrumentalities which first circumferentially score the tubes 22 on said mandrels adjacent each end of said tubes and then remove the surplus material defined by said scoring. The rails 77 preferably comprise angle-irons as shown and thus are provided with side-flanges to prevent axial displacement of the mandrels thereon.

The mandrels are propelled by a pair of conveyor chains 83, 83 which are provided with means for engaging the end portions of a mandrel and moving it laterally along the rails 82 while permitting it to rotate on its own axis. Each conveyor-chain 83 is mounted upon sprockets 84, 85, and the sprockets 84 are mounted upon a shaft 86 and the sprockets 85 are mounted upon a shaft 87, said shafts being journaled in the opposite ends of a pair of vertically adjustable brackets 88, 88 mounted above the framework 25. The brackets 88 are individually adjustable by means of screws 89 which are threaded through said brackets at each end thereof and rest upon suitable seats on the framework 25. Lateral displacement of the brackets 88 is prevented by the shafts 86, 87 and longitudinal displacement is prevented by a pair of forked brackets 90, 90 mounted upon the framework 25 adjacent the respective ends of the shaft 86 and embracing said shaft to prevent lateral movement thereof while permitting it to be raised and lowered with the brackets 88. The shaft 86 is driven by a sprocket chain 91 from a suitable source of power (not shown).

Figures 8, 9, 10:
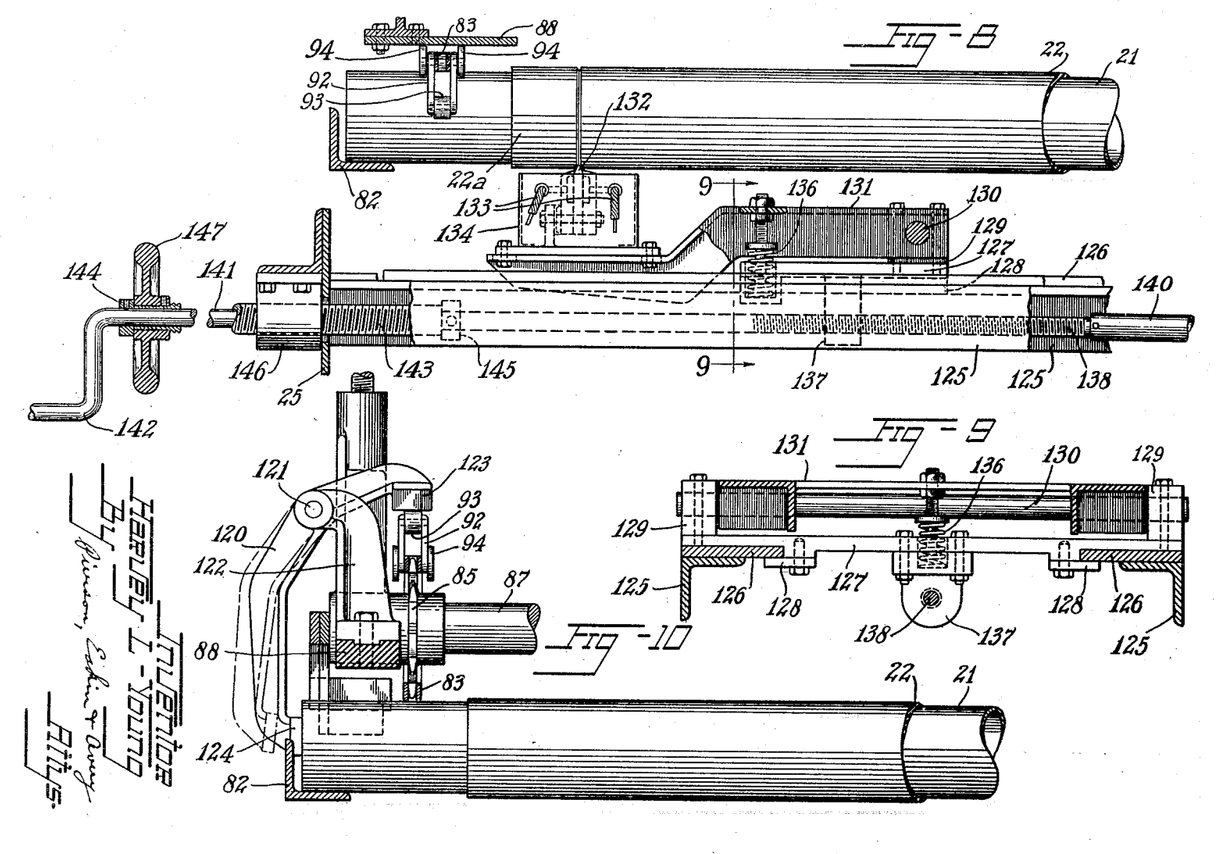
Fig. 8 is a section on line 8—8 of Fig. 1.
Fig. 9 is a section on line 9—9 of Fig. 8.
Fig. 10 is a section on line 10—10 of Fig. 6.
Figure 11:
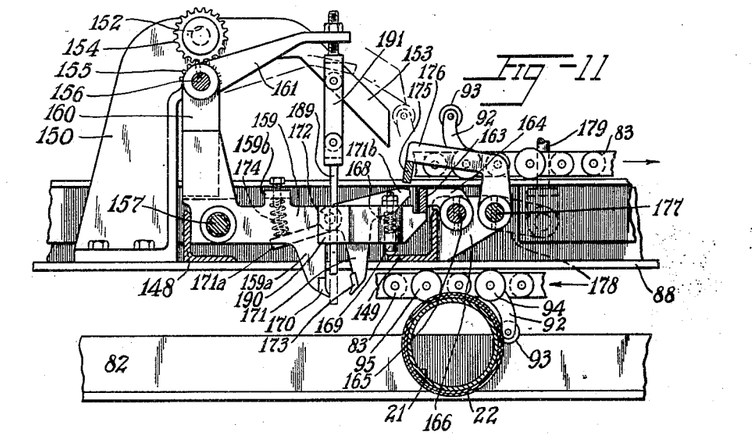
Fig. 11 is a section on line 11—11 of Fig. 2.

For engaging the mandrels 21 to propel them along the trackway 82, each conveyor chain 83 is provided with a plurality of special links positioned equi-distant from each other on the chain, and each of said special links embodies an angular structure having an outwardly extending finger 92 with a roller 93 journaled in its end portion. A pair of roller-discs 94, 94 are journaled on each side of the chain at the angle of each special link, and on the next link in advance of each special link is a similar pair of roller discs 95, 95, the discs 94, 95 being larger in diameter than the width of the chain 83. As shown in Fig. 11, the mandrel 21 is propelled forward by the fingers 92, the roller 93 therein rotating with the mandrel and thus reducing the friction therewith, and the roller-discs 95, which are in advance of the mandrel, preventing the latter from traveling faster than the chains 83 by providing another point of contact between the latter and the mandrel. The roller-discs 94, 95 also prevent the chains 83 from scraping against the bottom of the brackets 88 when the mandrel is raised during the tube-scoring operation, as shown in Fig. 8. The fingers 92 actuate numerous mechanisms presently to be described.

The storage-chute 77 is of sufficient length to accommodate a plurality of mandrels, and escapement mechanism is provided for holding the mandrels in laterally-spaced positions to avoid chafing of the wrappings 22 thereon from contact with each other, and for delivering the mandrels in orderly succession to the position where they are engaged by the fingers 92 of the conveyor chains 83.

One element of the escapement mechanism comprises a pair of lever-arms 96, 96 which are pivoted at 97, 97 on the outer faces of the respective brackets 88, and normally rest upon support-pins 98, 98 extending therefrom. The lever-arms 96 extend forward to a position over the storage-chute 77 and their end portions are bent at right angles to provide abutment faces for engaging the respective end portions of a mandrel 21 as the latter is first moved from the conveyor 20 onto said storage-chute and released by the arms 78. Each lever-arm 96 is formed with an upstanding cam-ear 99 which is angularly bent so as to extend over the upper reach of the conveyor chain 83 and into the orbit of the fingers 92 thereon, said bent portion being formed with an oblique cam-face 100 adapted to be engaged by said fingers 92. The arrangement is such that the lever-arms 96 are periodically raised by the fingers 92 to release a mandrel 21 on the chute 77 and permit said mandrel to roll downward, by gravity, until engaged by a second escapement member.

The second escapement member comprises a pair of arms 101, 101 which are pivoted at 102, 102 on the outer faces of the brackets 88 and rest upon the respective support-pins 98 thereon. Said arms 101 lie adjacent and parallel to the arms 96 and extend forward to a position over the storage-chute 77 somewhat behind the said arms 96, their end portions being bent at right angles to provide mandrel-abutments, for engaging the respective end portions of a mandrel as the same rolls down the chute after being released by the raising of the lever-arms 96.

Each arm 101 is formed with an upstanding cam-ear 103 which is angularly bent so as to extend over the upper reach of the conveyor chain 83 and into the orbit of the fingers 92 thereon, said bent portion being formed with an oblique cam-face 104 for engagement with said fingers. The cam ears 103 are so positioned in the orbit of the fingers 92 that they are engaged thereby before the cam-ears 100, with the result that the arms 101 are first raised to release the mandrel held by them, and then lowered again before the lever-arms 96 are raised to release the mandrel they are holding.

The third member of the escapement mechanism comprises bell-crank levers 105, 105 pivotally journaled at their respective elbows 106 in suitable bearings upon the under side of the track-rails 82, each of the levers 105 having a horizontal forwardly extending arm 107 formed with an upwardly turned end portion 108 having an oblique work-engaging face. The end portions 108 are positioned at the bottom of the chute 77, and form positive stops for mandrels 21 as the latter roll to the bottom of the chute when released by the escapement members 101. Mandrels resting against the stops 108 are in position to be engaged by the fingers 92 as the latter pass around the sprockets 85 as is shown in Figs. 6 and 7.

The other arm of each bell-crank lever 105 extends upwardly and is connected by a link 109 (Figs. 1 and 2) with the upwardly extending arm of a bell-crank lever 110 which is pivoted at 112 on the bracket 88 adjacent the rear end thereof, the other arm of said bell-crank lever 110 extending rearwardly and having its end portion formed with a lateral extension 113 which extends over and rests upon the conveyor-chain 83 above the sprocket 84, said extension 113 thereby comprising a cam-face adapted to be engaged and lifted by successive fingers 92 as they pass around said sprocket, for the purpose of lowering the stops 108 at timed intervals, which is just before the mandrels are engaged by the fingers 92. The weight of the bell-crank arm which includes the cam face 113 is sufficient to restore the bell-crank and parts connected therewith to normal position after disengagement with a finger 92.

For yieldingly holding a mandrel 21 in position until it is securely positioned between the roller-discs 94, 95 and engaged by the fingers 92, after the escapement members 108 have been lowered out of engagement with a mandrel, I provide a pair of downwardly extending arms 114, 114 mounted upon the opposite end-portions of a horizontal shaft 115 which is disposed transversely of the apparatus and is journaled in bearing-brackets 116, 116 mounted on the respective brackets 88. Each arm 114 is urged toward work-engaging position by a tension spring 117 which connects said arm with an extension 116a of the bracket 116, and an adjustable position-stop 118 is provided for defining said work-engaging position. The free end of the arm 114 is provided with a work-engaging roller 119 to avoid damaging the tube 22 on the mandrel as the latter is drawn under the arm 114 by turning said arm on its pivot against the pull of the spring 117.

Figure 1:
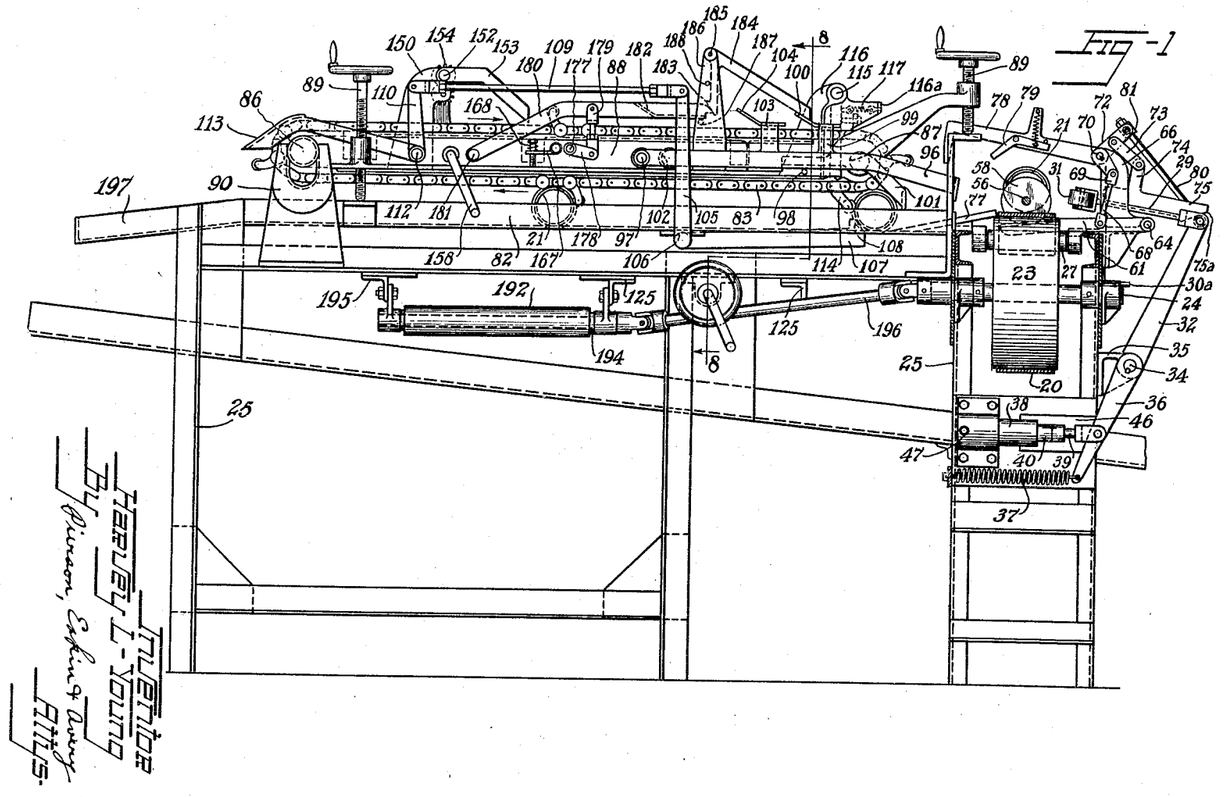
Fig. 1 is a side elevation of apparatus embodying and adapted to carry out my invention in its preferred form, and the work therein, parts being broken away and in section.

As shown in Fig. 6, the track-rail 82 which is on the far side of the apparatus as viewed in Fig. 1 has its lateral flange removed along the side of the storage chute 77 so that mandrels which may be moved off the conveyor belt 20 in a slightly angular position will not roll against the end of said flange.

For positioning the mandrels axially so they will positively miss the end of the track-flange shown in Fig. 6, I provide a generally arcuate arm 120 which is pivoted at 121 between its end portions in a bracket 122 mounted upon the adjacent bracket 88. One end of the arm 120 extends over the conveyor chain 83 and is formed thereat with a cam-face 123 (Fig. 10) which normally rides upon said chain and is adapted to be engaged by the fingers 92 thereon. The other end of the arm 120 extends downward to a point which is opposite the end of a mandrel when the latter is resting against the stops 108, and is there formed with an enlarged work-engaging pad 124. The arrangement is such that the pad 124 normally is in the position indicated by the broken lines of Fig. 10 but assumes the full line position when one of the fingers 92 raises the cam-face 123, with the result that the end of the mandrel resting against the stops 108 is moved to a position inside the lateral flange of the track 82.

The conveyor chains 83 travel at a speed which enables them to engage more mandrels than can be delivered to them by the conveyor 20 so that congestion of the storage-chute 77 is avoided.

Tube-scoring mechanism

Secured to the framework 25 and extending transversely thereof are parallel spaced apart angles 125, 125 to each of which are secured two slide plates 126, 126 positioned adjacent each side of the apparatus, and a pair of slides, such as the slide 127, Figs. 8 and 9, are mounted upon the slide plates 126 and span the space between the angles 125. Cleats 128, 128 secured to the slides 127 and engaging the slide-plates 126 hold the slides securely upon the latter.

Each slide 127 is provided at each side with upstanding ears 129, 129 in which is journaled a shaft 130. The latter supports one end of an open frame 131 upon the other end of which is mounted a tube-scoring device comprising a knife 132 which is electrically heated by the electrical conductors 133. The knife 132 is mounted in a box-like structure 134 and surrounded, except for its cutting edge, with non-combustible heat-insulating material 135 such as asbestos. The knife 132 is disposed parallel to the track-rails 82 and is yieldingly urged upward so as to engage a mandrel thereon by an adjustable compression spring 136 mounted between the slide 127 and the frame 131, with the result that a rubber tube on said mandrel is circumferentially scored and cut through as the mandrel is propelled over the knife. The surplus tube-stock defined by said scoring is designated 22a.

For adjusting the knives 132 toward or away from each other in the scoring of tubes of different lengths, each of the slides 127 is provided with a downwardly extending ear 137 through which are threaded respective right and left hand screws 138, 139, connected to each other by a suitable coupling member 140. The screw 138 is formed on one end of a smooth shaft 141, its other end extending through the frame of the machine at the near side thereof as viewed in Fig. 1 and having its end portion formed as a hand-crank 142.

For adjusting the knives 132 as a unit toward either side of the machine according as the tubes 22 are mounted at different positions axially of the mandrels, an externally threaded sleeve 143 is journaled on the shaft 141 between collars 144, 145 thereon and threaded through a nut 146 mounted upon the frame-work 25. Mounted upon the outer end of the sleeve 143 is a hand-wheel 147 by which the sleeve is rotated to move axially in the nut 146 and thereby move the right and left-hand screws 138, 139 axially without rotating them.

*Stock-removing mechanism*

The mechanisms for removing surplus tube-stock 22a from each end of a mandrel after the latter has been propelled over the hot knives 132 are offset from each other so that one of them engages the work before the other. This arrangement avoids the possibility of causing the mandrel to cease rotating on its own axis because of excessive friction with the stock-removing mechanisms. The latter are positioned at opposite sides of the apparatus, and as they are identical in construction, but one of them will be described.

A pair of parallel supporting angles 148, 149 are disposed transversely for the apparatus, to the left of the knives 132 as viewed in Fig. 2, said angles being supported from their respective ends which are secured to the brackets 88, and have their medial portions bent in a reverse curve as shown to effect mis-alignment of their end portions.

A bearing-bracket 150 is mounted upon the bracket 88 with its journals extending over the angle 148 (Fig. 11), and another bearing-bracket 151 is mounted upon said angle at a distance from the bracket 150. Journaled in the upper bearing of the bracket 150 is a short shaft 152 upon one end of which is mounted a cam-arm 153 which extends forward over the chain 83 and has its end portion disposed in the orbit of the fingers 92. The other end of the shaft 152 is provided with a gear 154 which is meshed with a gear segment 155 mounted on a shaft 156 which is journaled in the bearing brackets 150, 151. A rock-shaft 157 journaled in the bracket 151 and in the bracket 88 has its end outside the latter formed as a hand-crank 158, and that portion of its structure between the brackets is formed with screw threads.

Mounted upon the threaded portion of the shaft 157 is an L-shaped arm 159 the short leg of which is forked and extended vertically to straddle the downwardly extending portion of a forked member 160 which is slidably mounted upon the rock-shaft 156 which extends through its forked portion, and a forwardly extending rocker-arm 161 is adjustably secured on the rock-shaft 156 between the forks of the member 160. The arrangement is such that when the shaft 157 is rotated to change the position of the arm 159 transversely of the apparatus, the rocker-arm 161 also will be moved so as to maintain the same position with relation thereto.

The long leg of the arm 159 extends forward over the angle 149 and is there engaged by a yielding hold-down device comprising an elongate bar 163 which is secured to the ends of arms 164, 164 mounted upon a shaft 165, the latter being journaled in bearing-brackets 166, 166 which are secured to the angle 149. The shaft 165 extends through the bracket 88 and is provided at the outer side thereof with a lever 167 (Fig. 1) which is engaged by and adjustable compression spring 168, with the result that the bar 163 is normally urged downward against the end of the arm 159. The end portion of the long leg of the arm 159 is formed with a hollow boss 168 in which is mounted a spring-pressed bolt 169 normally urged downward against the angle 149. The arrangement is such that the arm 159 is normally held in neutral position horizontally but has a limited movement up or down against yielding springs. The length of the bar 163 is such that the hold-down device is in engagement with the arm 159 whatever the position of the latter.

Figure 12:
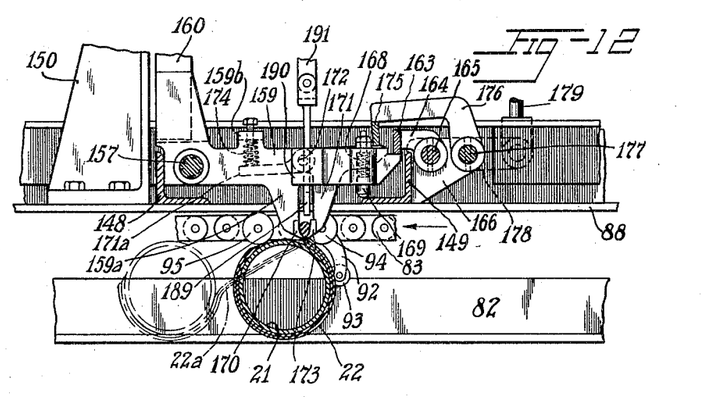
Fig. 12 is a view of the mechanism shown in Fig. 11 at a later stage of operation.
Figure 13:
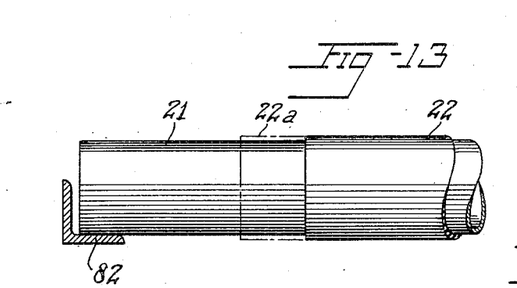
Fig. 13 is an elevation of one end of a tube after being trimmed according to this invention.

The arm 159 is formed with a downwardly extending jaw portion 159a to the lower end of which is affixed a hardened blade or chisel 170 which extends into the path of mandrels which are propelled along the track-rails 82, said chisel being adapted to engage the mandrels tangentially in the zone of the tube-surplus 22a and scrape a portion of the same from the mandrel as shown in Fig. 12. The length of the chisel 170 is the same as or greater than the axial width of the tube surplus 22a, and the chisel is replaceable so that tubes having scored surplus portions of greater width may be trimmed. The yielding pivotal mounting of the arm 159 permits the latter to adjust its position when engaged by mandrels which are slightly larger than the proper size.

The tube stock 22a scraped from the mandrel 21 by the chisel 170 is gripped between the latter and a jaw member 171 which is pivoted at 172 on the arm 159, said jaw 171 being similar in shape to the jaw portion 159a of the arm 159 and having its work-engaging end provided with a replaceable facing 173 preferably of the same length as the chisel 170. The jaw member 171 normally is held in open position with relation to the jaw 159a by a compression spring 174 mounted between an outstanding ear 159b formed on the arm 159 and a rearward extension 171a formed on the jaw member 171.

For actuating the jaw member 171 at determinate intervals corresponding to the passage of a mandrel under the chisel 170, said jaw member is formed with a forwardly-extending portion 171b the end portion of which is positioned beneath an elongate bar 175 parallel to the bar 163 and adapted to be depressed upon the jaw-portion 171b. The bar 175 is secured to the ends of arms 176, 176 mounted upon a shaft 177 which is journaled in the brackets 166, 166 and extends through the bracket 88, and a lever 178 is secured to the end of the shaft 177 outside said bracket 88.

A link 179 connects the free end of the lever 178 with the intermediate portion of a lever 180 which is pivoted at 181 on the bracket 88 and extends upward and forward therefrom and has its free end formed with a lateral extension 182 projecting over the upper reach of the conveyor chain 83 and comprising a cam-face adapted to be lifted by the fingers 92 on said chain to rock the shaft 177, depress the bar 175 and thereby actuate the jaw 171 so that it cooperates with the chisel 170 in gripping the tube-surplus stock scraped from the mandrel 21 by the chisel.

For holding the lever 180 in raised position so that the jaws 159a, 171 retain their grip on the tube-surplus stock after the actuating finger 92 passes from beneath the cam-face 182, I provide a latch 183 formed on the lower end of the downwardly extending arm of a bell-crank 184 pivoted at its elbow at 185 on a bracket 186 mounted upon the bracket 88, the other arm of said bell-crank extending obliquely forward and downward to rest upon the cam-face 100 of the escapement-arm 96. The arrangement is such that when the lever 180 is raised by a finger 92 its end portion is engaged by the latch 183, and the lever is held in raised position until the finger 92 subsequently engages the cam-face 100 and raises the other arm of the bell crank 184 which releases the latch 183 and permits the lever 180 to drop back to normal position, upon a support pin 187. A stop pin 188 projecting from the bracket 186 defines the normal position of the latch 183 while at rest.

During the interval that the chisel 170 and the jaw 171 grip the tube-surplus stock scraped from the mandrel 21 as shown in Fig. 12, the mandrel is impelled rearwardly and rotates on its own axis, as indicated by the broken lines of said figure, with the result that the surplus tube-stock 22a is unwrapped from the mandrel. The subsequent opening of the jaw 171 is timed to occur after the surplus tube-stock is entirely removed from the mandrel.

For positively disengaging the removed surplus stock from the chisel 170 to which it usually adheres when the jaw 171 is opened, a vertically movable ejector 189 is slidably mounted in a slotted boss 190 formed on the arm 159, and has its upper end connected by a link 191 to the free end of the rocker-arm 161. The lower end of the ejector is positioned between the jaws 159a, 171, as shown in Figs. 11 and 12 and is adapted to be lowered by said rocker-arm to the position indicated by the broken lines of Fig. 11 to scrape from the chisel 170 any of the surplus tube-stock adhering thereto. The lower end of the ejector 189 preferably is substantially the same width as the chisel 170 so as to assure the removal of all the stock therefrom.

The surplus tube-stock is removed from the apparatus by an endless conveyor belt 192 upon which the stock falls after being ejected from the stock-removing mechanism. The conveyor belt 192 is disposed transversely of the apparatus and is mounted upon end-pulleys 193, 194 which are journaled in suitable brackets secured to the angle 125 and a similar angle 195 mounted parallel thereto on the framework 25. The pulley 194 is driven by a drive-shaft 196 connected with the pulley-shaft 24.

The rear end of the apparatus is provided with an inclined delivery chute 197 comprising the terminal portion of the track-rails 82, for receiving the mandrels with the trimmed tubes thereon after the mandrels are released by the fingers 92 at the top of said chute as the chains 83 pass upward around the sprockets 84.

*Operation*

In the operation of the apparatus, the mandrels 21 with the unvulcanized rubber tubes 22 thereon are delivered to the apparatus upon the conveyor belt 20, moving in procession in an axial direction thereon. Each mandrel, in turn, is impinged against the yielding buffer-plate 58 which in its backward movement opens the valve 48 and admits pressure-fluid to the cylinder 38. This causes the latter to execute an operative cycle which first causes the arms 78 to be lowered and the mandrel raised from the conveyor belt by the levers 61 and 62, and then causes the push-rods 29 to be projected across the conveyor belt to move the mandrel onto the upper end of the storage chute 77 where it is momentarily held by the arms 78. The arms 78 then rise and the mandrel is engaged by the first member 96 of the escapement mechanism.

Successively the escapement members 96, 101, and 107 operate to allow the mandrel intermittently to roll down the storage chute 77 until it is finally held by the yielding arms 114 in position to be engaged by the propelling fingers 92 of the conveyor chain 83. The speed of the latter is such that they can convey mandrels from the storage-chute faster than the mandrels are brought thereto by the conveyor belt 20, so that congestion of the storage-chute is avoided.

The mandrel is propelled along the track-rails 82 by the fingers 92 which permit the mandrel to rotate on its own axis, and it passes over the electrically heated knives 132 which score the tube 22 thereon circumferentially adjacent its respective ends, and define surplus portions 22a.

The course of the mandrel carries it beneath the chisels 170 which gouge or scrape the surplus tube stock 22a locally from the mandrel, and then the jaws 171 are closed to grip the scraped-off stock between themselves and the chisels and hold it while the mandrel continues its rolling progress which strips the remainder of the surplus stock from the mandrel. The jaws 171 are then opened and the ejector 189 is depressed to scrape off any surplus tube stock adhering to the chisel 170, said stock falling onto the conveyor belt 192 and being carried thereon from the apparatus and deposited in a suitable receptacle (not shown).

The trimmed mandrel 21 is released by the fingers 92 as they pass upward around the sprockets 84, and the mandrel rolls by gravity down the inclined chute 197 from which it is manually removed for subsequent treatment.

The apparatus is entirely automatic in operation and universal in its adaptability to trimming tubes of various lengths and diameters. The escapement mechanism operates independently of the kick-off mechanism so that the latter may operate at irregular time intervals.

My invention is susceptible of modification and I do not limit my claims to the exact procedure described or the specific construction shown.

I claim:

1. The method of removing surplus rubber from a supporting form which comprises effecting a translative movement of the form past a surplus-removing position, removing stock locally from the form at said position, and by holding the stock so removed causing the movement of the form to effect the removal of the remainder of the surplus stock therefrom.

2. The method as defined in claim 1 in which the movement of the form is uninterrupted throughout.

3. The method of trimming an annular zone of surplus stock from a rubber tube upon a mandrel which comprises engaging and holding a part of the excess stock against movement while effecting uninterrupted rolling movement of the mandrel in a determinate course away from the part so held whereby the surplus stock is concurrently pulled and unwound from the mandrel, the removal of the surplus stock being initiated at the respective ends of the tube in timed succession.

4. The method of trimming an annular zone of surplus stock from a rubber tube upon a mandrel which comprises effecting an uninterrupted translative movement of the mandrel, circumferentially scoring the tube thereon to define a surplus portion thereof, and then removing said surplus portion from the mandrel, all during the said uninterrupted movement.

5. A method as defined in claim 4 in which the movement of the mandrel is concurrently lateral and rotary.

6. The method of trimming an annular zone of surplus stock from a rubber tube upon a mandrel which comprises continuously rotating a mandrel upon its own axis, scraping some of the surplus tube-stock from the mandrel as it is so rotated, and then holding the scraped-off stock while further rotation of the mandrel unwraps the latter from the remainder of the surplus stock.

7. The method of trimming an annular zone of surplus stock from a rubber tube upon a mandrel which comprises effecting concurrently a lateral, translative, and a rotary movement of the mandrel, circumferentially scoring the tube thereon at its respective ends to define annular surplus portions, scraping some of the surplus portions from the mandrel, and then by holding the stock so removed thereby causing the movement of the mandrel to effect the removal of the remainder of the surplus stock therefrom.

8. A method as defined in claim 7 in which the removal of the surplus stock is initiated at the respective ends of the tube in timed succession.

9. In apparatus for trimming an annular zone of surplus stock from a rubber tube upon a mandrel, the combination of means for effecting an uninterrupted translative movement of the mandrel, means for circumferentially scoring the tube thereon to define surplus portions, and means for removing said surplus portions, all during said uninterrupted movement of the mandrel.

10. Apparatus as defined in claim 9 in which the translative movement of the mandrel is concurrently lateral and rotary.

11. In apparatus for trimming an annular zone of surplus stock from a rubber tube upon a mandrel, the combination of means for effecting the uninterrupted rotation of a mandrel upon its own axis, means for scraping some of the surplus tube-stock from the mandrel and means for holding the excess stock thus removed while the movement of the mandrel effects the removal of the remainder of said excess stock.

12. In apparatus for trimming an annular zone of surplus stock from a rubber tube upon a mandrel, the combination of means for effecting the uninterrupted lateral, translative and rotary movement of the mandrel, means for circumferentially scoring the tube thereon to define surplus portions at the ends thereof, means for scraping some of the surplus stock from the mandrel, and means for holding the scraped-off stock while continued progress of the mandrel removes the remainder of the surplus stock therefrom.

13. Apparatus as defined in claim 12 in which the tube-trimming means is so positioned as to initiate the removal of the surplus stock from the respective ends of the tube in timed succession.

14. In apparatus for removing a zone of surplus rubber from a supporting form, the combination of means for defining a zone of surplus rubber on the form, a pair of gripper jaws adapted to engage and hold a portion of said surplus rubber, and means for effecting relative movement of the form and the gripper jaws such that the surplus stock is removed from said form by said gripper jaws.

15. In apparatus for removing a zone of surplus rubber from a supporting form, the combination of scoring mechanism, a pair of gripper jaws adjacent thereto, and means for effecting relative movement of said supporting form, scoring mechanism and gripper jaws such as first to score the rubber on said form to define a zone of surplus stock and then effect the removal of the latter by said gripper jaws.

16. Apparatus as defined in claim 15 and including means for ejecting the surplus stock from the gripper jaws.

17. In apparatus for removing a zone of surplus rubber from a supporting form, the combination of a pair of gripper jaws, means for effecting relative movement of the form and the gripper jaws such that the latter remove a zone of surplus rubber from said form, and means for ejecting the stock thus removed from said gripper jaws.

18. In apparatus for trimming an annular zone of surplus stock from a tube upon a mandrel, the combination of means for effecting rotary movement of the mandrel, means for concurrently scoring both ends of the tube thereon to define annular zones of excess stock, and gripper jaws adapted to engage the excess stock on the tube-ends in timed succession to remove said stock during said movement of the mandrel.

19. In apparatus for trimming an annular zone of surplus stock from a rubber tube upon a mandrel, the combination of means for effecting a translative movement of the mandrel, a generally stationary jaw member extending to a position adjacent the path of the mandrel and adapted to scrape some of the surplus tube-stock therefrom, and a movable jaw associated with said stationary jaw and adapted to cooperate therewith to hold back the scraped-off stock while further progress of the mandrel removes the remainder of the surplus stock.

20. Apparatus as defined in claim 14 including means for ejecting the surplus tube-stock from between the jaw members.

21. In apparatus for trimming an annular zone of surplus stock from a rubber tube on a mandrel, the combination of tube-trimming mechanism, and a conveyor for carrying mandrels into operative association with said tube-trimming mechanism and for actuating the latter at determinate time-intervals.

22. In apparatus for trimming a rubber tube on a mandrel, the combination of tube-trimming mechanism for removing an annular zone of surplus stock from a tube on a mandrel, mechanism for ejecting said surplus stock from the tube-trimming mechanism, and a conveyor for carrying mandrels into operative association with the tube trimming mechanism and for actuating the latter and the ejector mechanism in timed relation to each other and to the position of the mandrel.

In witness whereof I have hereunto set my hand this 23rd day of March, 1928.

HARVEY L. YOUNG.